United States Patent [19]

Sieber

[11] Patent Number: 5,181,429
[45] Date of Patent: Jan. 26, 1993

[54] HEADLAMP POSITIONING DEVICE

[75] Inventor: Edmond Sieber, Donatyre, Switzerland

[73] Assignee: Saia AG, Switzerland

[21] Appl. No.: 734,928

[22] Filed: Jul. 24, 1991

[30] Foreign Application Priority Data

Jul. 26, 1990 [CH] Switzerland .................. 02486/90

[51] Int. Cl.$^5$ .................. F16H 27/04; H02P 8/00; B60Q 1/06
[52] U.S. Cl. .................. 74/89.15; 318/696; 362/66; 362/273; 362/287
[58] Field of Search .................. 74/89.15, 89.16; 362/66, 69, 273, 287, 289, 428; 318/696

[56] References Cited

U.S. PATENT DOCUMENTS

| | | | |
|---|---|---|---|
| 3,802,281 | 4/1974 | Clarke | 74/89.15 |
| 4,179,944 | 12/1979 | Conner | 74/89.15 |
| 4,524,407 | 6/1985 | Igura | 362/273 X |
| 4,567,434 | 1/1986 | Lindig | 318/696 X |
| 4,655,567 | 4/1987 | Morley | 362/66 X |
| 4,719,810 | 1/1988 | St. Cyr et al. | 74/89.15 |
| 4,791,343 | 12/1988 | Ahrendt | 318/696 |
| 4,841,790 | 6/1989 | Williston et al. | 74/89.15 |
| 4,843,523 | 6/1989 | Nakamura | 362/69 |
| 4,863,410 | 7/1988 | Kressirer et al. | 318/696 |
| 4,876,906 | 10/1989 | Jones | 74/89.15 |
| 4,884,174 | 11/1989 | Dorleans | 362/287 X |
| 4,916,587 | 4/1990 | Hirose et al. | 362/289 X |
| 4,967,319 | 10/1990 | Seko | 362/66 X |

FOREIGN PATENT DOCUMENTS

| | | |
|---|---|---|
| 0182774 | 5/1986 | European Pat. Off. . |
| 0340735 | 11/1989 | European Pat. Off. . |
| 2471883 | 6/1981 | France . |
| 61-64548 | 4/1986 | Japan . |
| 90/07440 | 7/1990 | PCT Int'l Appl. . |

Primary Examiner—Leslie A. Braun
Assistant Examiner—Ryan W. Massey
Attorney, Agent, or Firm—Ostrolenk, Faber, Gerb & Soffen

[57] ABSTRACT

A headlamp positioning device having a stepping motor and a sensor for detecting loss of steps in the motor. An electronic controller operating in open-loop with the motor automatically reinitiates the positioning upon the detection of loss of steps due to an impediment during the positioning of the headlamps.

15 Claims, 3 Drawing Sheets

HEADLAMP POSITIONING DEVICE

BACKGROUND OF THE INVENTION

The present invention relates to a positioning device, in particular a device having at least one element capable of occupying different predetermined positions between two extreme positions. The element being coupled to a driving shaft driven by a stepping motor.

Devices of this kind often comprise different mechanical elements, some of which are mounted with axial play not exceeding a previously assigned limit in order to make the device capable of operating in conformity with required criteria of precision and reliability. Consequently, the present invention also relates to a method of adjustment of such axial play.

Such devices can be used in different areas requiring the same kind of technical application. A preferred application is in the positioning of the optics or headlamps of a car.

The positioning of optics of a car can be done in different ways. Frequently a direct current or DC motor is used. A potentiometer transmits the position of the driving shaft to a control device (which in this application is axially displaceable), that is an indication of the position of the shaft at a given time. The maintenance of this position is executed as a function of a given signal. It concerns, therefore, a control of the analog type working in a close-loop.

It is, however, observed that drivers using a DC motor are not satisfactory for the following reasons.

First, with known devices, a problem of compatibility is encountered because of the increasing use of digital controls. It is desirable that the positioning device be connected to a microprocessor, which is not feasible in the case of a DC motor.

Second, it is observed that the potentiometer is exposed to wear, and change in its operation is accelerated as a result of the environmental conditions of use, such as a high temperature range. For these reasons, the accuracy of positioning is not ensured in spite of mechanical gearing down provided on most of the known devices.

Patent application EP-A-0 340 735 discloses a device for the adjustment of the inclination of a headlamp of a car, that is, of the light beam. This adjustment requires a stepping motor having a direction of rotation and number of turns dependent on a microprocessor, and a control unit for the signals received from an optical sensor having five elements E1 to E5. However, the patent does not disclose or suggest any means for repositioning the optical beam, nor for taking up the axial play.

Patent application EP 0 182 774 describes the problem of correcting the position of the element to be adjusted; a correction necessary because of the loss of steps of the stepping motor. The solution proposed in this case consists of momentarily delivering a determined higher current to the motor, if the number of steps to be executed and the number of effectively realized steps are different.

This solution presents, among others, the drawback of creating an excessive stress on the stepping motor as a function of the extent of the obstacle to overcome, which renders the correction necessary. Moreover, this approach generates disturbances in the stepping motor so that the desired position may not be attained or attained with such error margin that the system is unsuitable.

Thus, the problem of the reliability of the positioning devices, and above all of the precision of their operation, still remains unresolved. It is fundamental, however, from the moment the motor is switched on, to bring the headlamp of a car from position "1" to position "2", the latter should be effectively reached by the headlamp with a tolerance as small as possible and independent of the environmental conditions of use. Therefore, in a preferred device, the absolute error in positioning of the headlamps of a car should not exceed 0.1 mm. Moreover, it is necessary that the position attained be maintained in spite of external stress in order to fully benefit from the advantages of the relatively precise positioning. The solution to these problems is dependent on the precision which can be attained in the axial play, which should not exceed 0.05 mm, for the field of application of the present invention.

SUMMARY OF THE INVENTION

Accordingly, an object of the present invention is to eliminate the observed drawbacks in the known devices, and to propose solutions for the problems mentioned, by providing a positioning device which is reliable and of good quality. Another object is to provide a positioning device for positioning at least one element which can occupy different predetermined positions between two extreme positions. The element is coupled to a driving shaft driven by a stepping motor, and includes means for reinitiating the counting of the number of steps, the stepping motor being controlled by an open-loop control.

A device invented by the same applicant, described in the Swiss patent application no. 1 980/90, is incorporated herein by reference. Using this device, comprising a detector for loss of synchronization, the position of the driving shaft capable of axially shifting, is determined indirectly by counting the number of steps. If an incorrect stop, consisting of an accidental abutment arises, the error of positioning is signalled by the detection of the lost steps, resulting in the driving shaft travelling back against a back stop in order to reinitiate the counting operation. Thus, there is provided an open-loop adjustment without a physical element, like a potentiometer, being necessary for indicating the position of the shaft.

Other features and advantages of the present invention will become apparent from the following description of the invention which refers to the accompanying drawings.

DESCRIPTION OF EMBODIMENTS OF THE INVENTION

Figure 1:
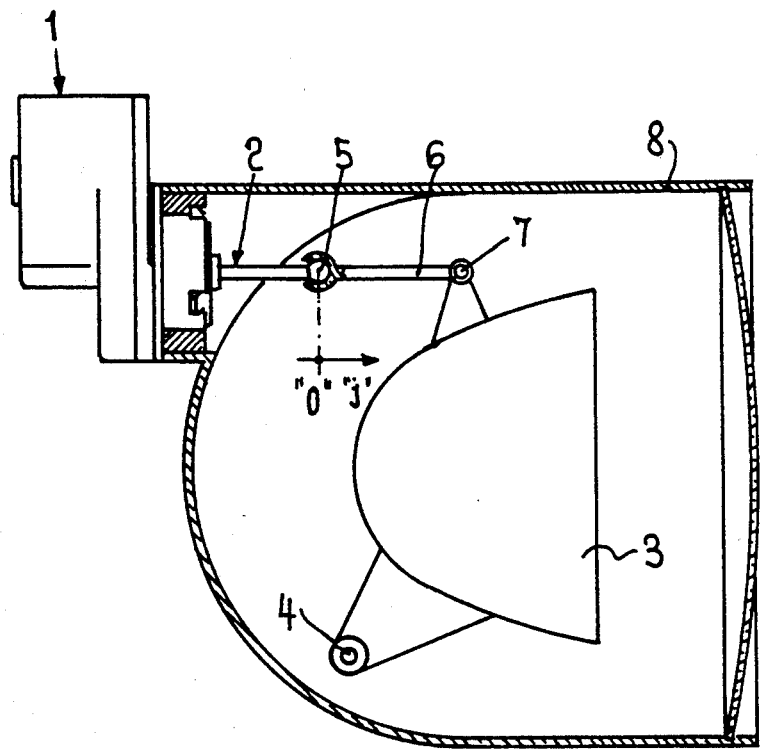
FIG. 1 shows schematically the device utilized for the adjustment of the position of the headlamps of a car.

Referring to FIG. 1, positioning device 1, utilized for the adjustment of an optic of a car 3, in its protective cover 8 is shown. The optic 3 is pivotally mounted on a shaft 4. The driving shaft 2 of the device 1 is connected to the articulation 7 through a spherical coupling 5 and an actuating rod 6. As a function of the load of the car, that is of its seat and its axial inclination, data which is detected for example by sensors (not represented), the position of the optic 3 will be automatically corrected by a control not represented. As a function of the received information, the shaft 2 will be shifted axially either toward the right (in FIG. 1), thereby effecting a translatory motion towards the outside, or towards the left, that is effecting a translatory motion towards the inside. These translatory motions cause the optic 3 to pivot about the shaft 4 to a position corresponding to a correctly directed beam. In less sophisticated embodiments, the control of the device 1 can be manually actuated by the driver of the car using a knob on the dashboard of the car.

Figure 2:
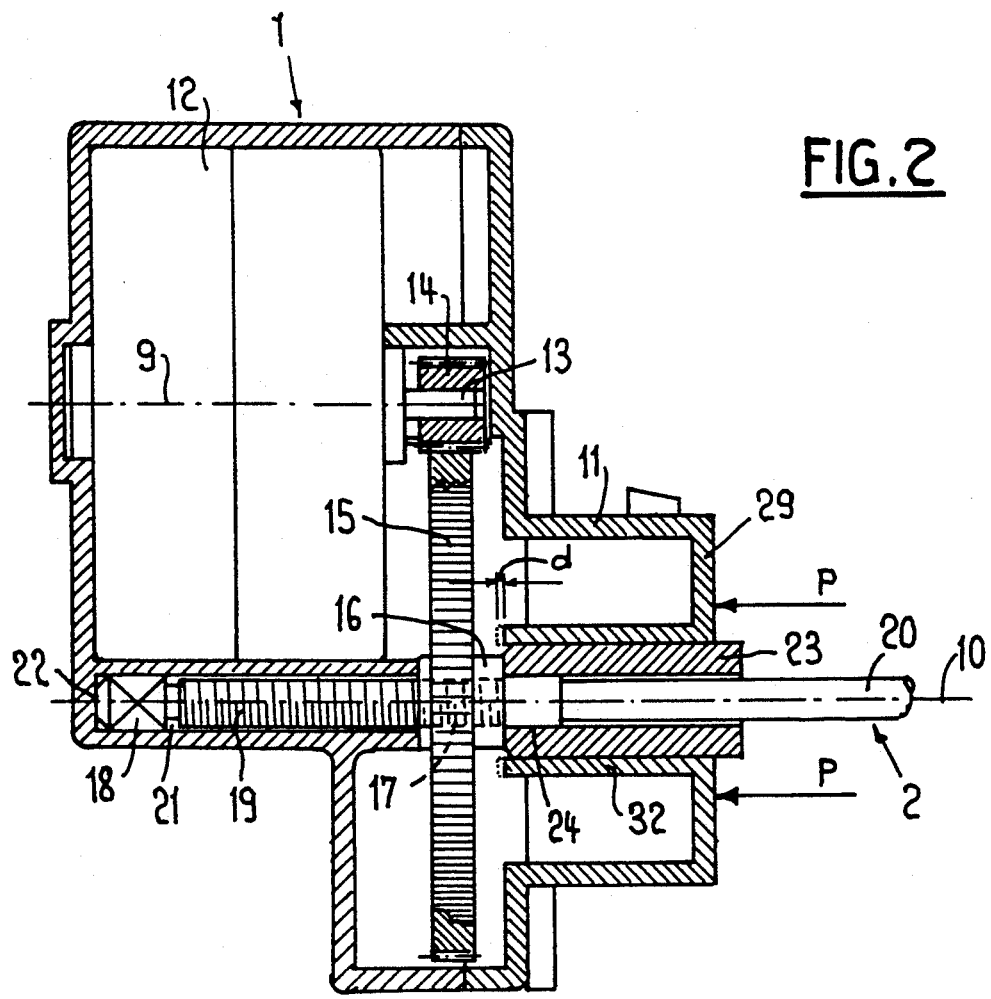
FIG. 2 shows a section of a first embodiment of the device along its plane of symmetry.
Figure 4:
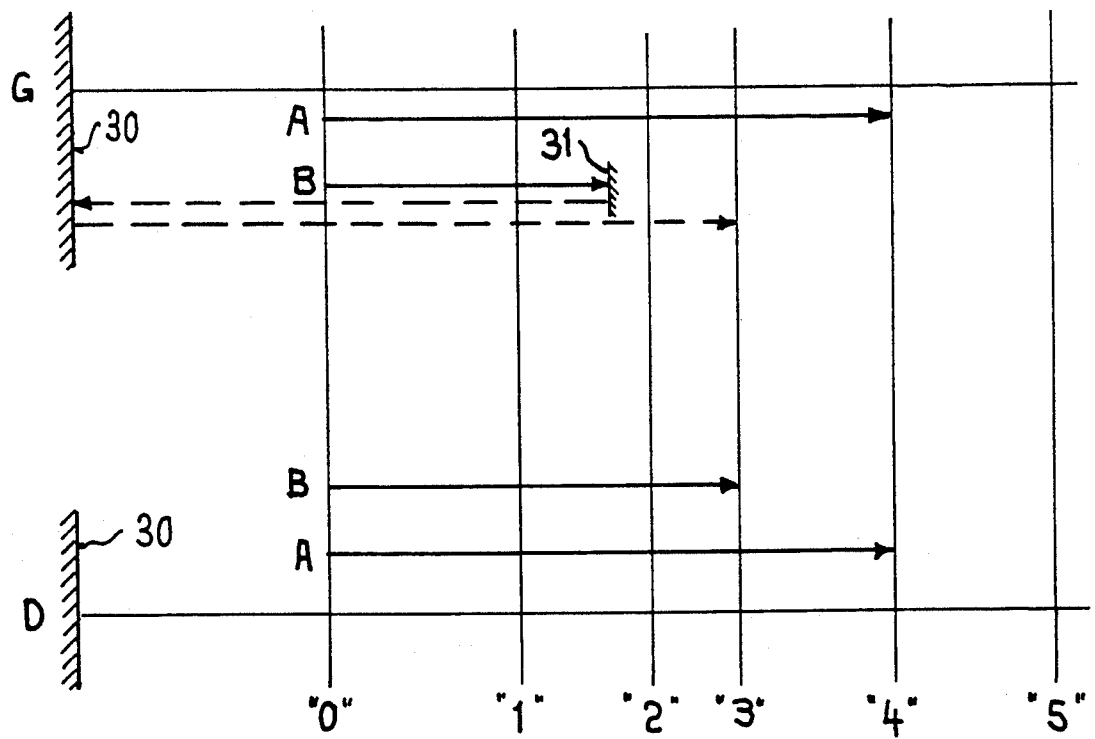
FIG. 4 is a schema explaining the positioning.
Figure 5:
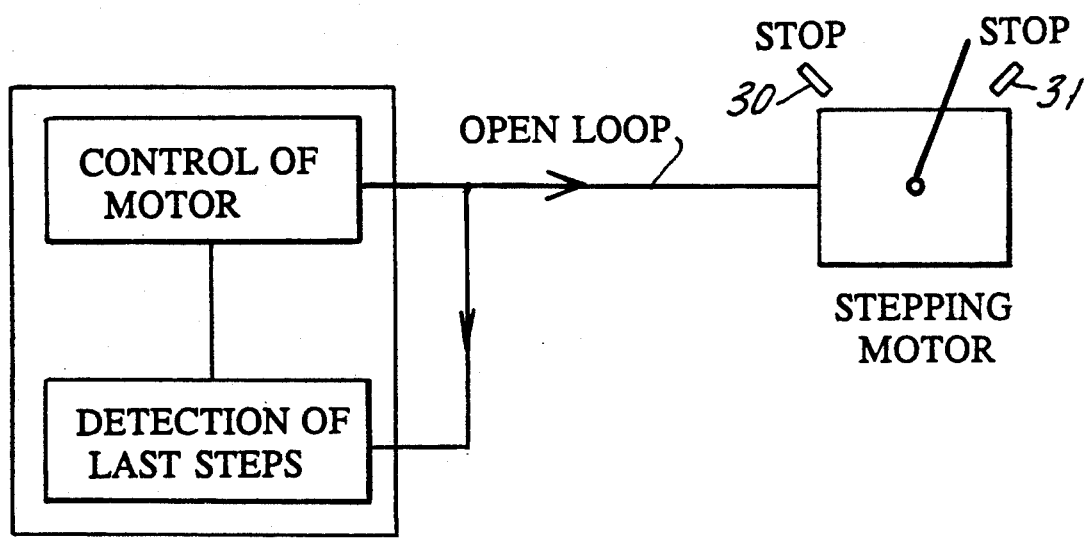
FIG. 5 is a block diagram illustration of the electronic controller system for detecting lost steps and reinitializing the counting of steps.

Referring to FIGS. 2 and 4, the device 1 has two portions: A motor portion having an axis 9 and a driving portion having an axis 10. The constitutive elements of the driving portion are enclosed in a cover 11. The motor portion includes the actuator or stepping motor 12 with a rotor shaft 13 on which is mounted a pinion 14 attached to it in rotation and translation, the pinion 14 forming the first element of a gear down mechanism. Moreover, as will be seen later on, it is absolutely necessary that the stepping motor 12 (preferably of the reverse type) be controlled by an electronic controller system for detecting the lost steps. This control, which is known to persons of ordinary skill in the art, is schematically represented in FIG. 5. The control circuit for the motor receives the output information from a detector which detects a loss of steps taken by the stepping motor and accordingly reinitiates the counting of steps when the motor is stopped by one of the stops 30, 31 shown in FIG. 4.

The driving portion has a wheel 15 gearing with the pinion 14 and forming the second element of the gear down mechanism, the reduction ratio of which is i. The hub 16 of the wheel 15 is provided with a threaded bore 17. The wheel 15 is mounted on the threaded part 19 of the driving shaft 2. The driving shaft 2 is bound into rotation by means of the extremity 18 presenting a square cross-section and being guided into a recess 21, the bottom 22 of this recess serving in this embodiment as a stop preventing the axial shifting of the shaft 2. The shaft 2 is supported on one side of the hub 16 by its extremity 18 and on the other side of the hub 16 by a bushing 23 bearing the portion 24 of the shaft 2. The shaft 2 also comprises the output shaft 20 projecting from the bushing 23 and reaching a spherical coupling (not represented in FIG. 2). The bushing 23 is mounted rigidly locked (as will be seen later on) in bearing 32 of the cover 11. The distance from the face 27 of the recess 21 to the face 28 of the bushing 23 is sufficient to allow a small functional play to the hub 16 as will be seen later on (see FIG. 3).

The operation of the device, the stepping motor of which is controlled by an electronic controller system for detecting lost steps, is as follows (FIGS. 1, 2 and 4). FIG. 4 represents a device G and a device D, respectively, coupled to the left headlamp and to the right headlamp of a car, the predetermined conditions are represented by "0", "1", "2", "3", "4" and "5" (positions designated by "0" and "j" in FIG. 1). The position of the headlamp is variable as a function of the load of the vehicle. The load in the car can vary the direction of the axis of the headlamp with respect to the road.

In a first illustrated case, it is determined that the device must pass from the normal position "0" to the position "4" indicated by the arrows A in FIG. 4. When the stepping motor 12 is switched on, the wheel 15 is rotated. The threaded hub 16 and the threaded part 19 of the shaft 2, bound into rotation, constitute a screw-nut system 17, 19 so that the shaft will undergo an axial shifting from the start position "0" to the desired position "4". Apart from the problem of axial play, this particular case does not pose any difficulty with regard to the precision of the positioning since the disadvantages created by the use of potentiometers are eliminated in the device. Difficulty in positioning will be encountered when the advance or the recoil of the shaft is hindered by an external cause, e.g. freezing of the condensation water in winter or after voluntary reinitiating (resetting), causing the stepping motor to travel against the rear stop 30, in FIG. 4, corresponding to the reference 22 in FIG. 2. In FIG. 4, the arrows B illustrate a case in which after having selected the position "3", only the right device D reaches this position while the left device G is blocked between the positions "1" and "2", corresponding to an accidental stop 31. During normal operation, that is, without any incident in the advancing of the shaft 2, the number of steps is counted, however, an accidental stop as well as the rear stop of reinitiating, can cause a loss of steps, the number of which is not counted and hence not known.

The operation in open-loop to overcome the problem in positioning of the device is best understood by the example of reinitiating, that is when the shaft 2 is brought against the rear stop 30, and the precision of positioning and its reliability are ensured by the means disclosed in the present invention. At the time of abutment, the rotor still receives pulses but there is no rotation. In fact, any stop during the travelling of the shaft 2 can induce the stepping motor to operate backwards by one or more preceding electrical cycles, either of four steps or of a multiple of four steps, this number being dependent on the elasticity of the stop. As already mentioned, the lost steps during this phase are not counted by the electronic control. However, experiments and measurements have shown that in practically all cases the number of lost steps never exceeds eight.

When the shaft moves from the stop 30, for example, by 50 steps to reach the position "0", the actual number of steps is not known. The actual number of steps may be, for example, forty six if the jump against the stop corresponds to a cycle of four steps. The resolution r, defined as the axial shifting of the shaft—without reduction—corresponding to one step of the motor, is given by $\alpha/360 \times p$, where $\alpha$ is the angular step of the motor and p the thread of the screw-nut system 17, 19. For a set of values such as $\alpha = 15$ and $p = 0.8$ mm, $r = 0.033$ mm/driving step. Assuming the loss of eight steps the error will be $8 \times 0.033 = 0.264$ mm, an error which is much greater than the level 0.1 mm which is permitted for this range of application. An appropriate reduction ratio permits division of this error so that the predetermined level is not exceeded. In this example, a ratio of reduction of three would be sufficient. This ratio could be greater if the number of lost steps is greater than eight. In practice, experiments have shown that with a reduction ratio of i=6, a relatively high factor of security is achieved so that error in positioning is always significantly smaller than 0.1 mm; i.e., a relative error less than 1% for a shifting of 10 mm.

The same reasoning applies if an accidental stop 31 occurs. In this case, due to the loss of steps, error in positioning is signalled by the detection of the lost steps, and the shaft 2 will go back against the rear stop for reinitiating the count. Then, the shaft 2 will go forward to the desired position which, if the stop 31 is no longer present, will be reached with the required precision.

Figure 6:
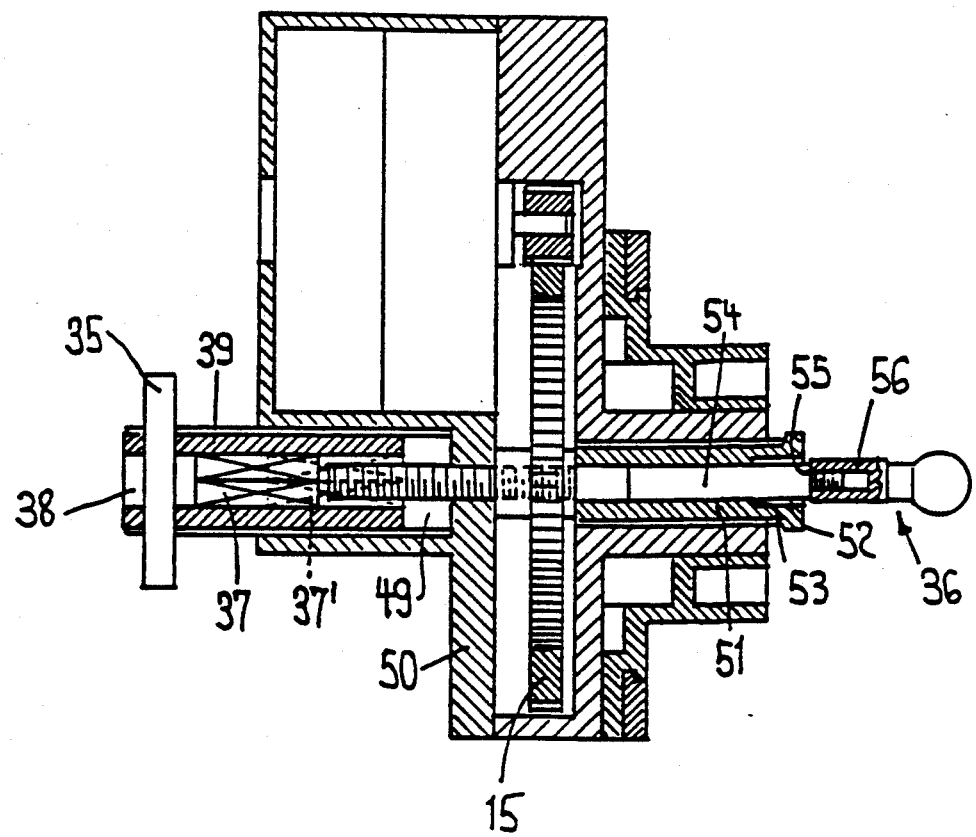
FIG. 6 is a section of a second embodiment of the device along its plane of symmetry.

In FIG. 6, a second embodiment of the invention is shown, in which manual adjustment means for resetting are provided at the rear part of the driving portion. The manual adjustment means permit adaptation of the positioning device to various types of headlamps, and to effect, if necessary, a periodic correction. Accordingly, the driving shaft 36 has as its rear extremity a polygonal section 37 which is axially adjustable (a different position 37' is represented in dotted lines, as an example) in the recess 38 of a threaded ring 39 screwed in the threaded recess of the housing 50, the thread being identical to the one of the screw-nut system 17, 19. The friction of the threads of the ring 39, in the corresponding threading in the housing 50, must be greater than the friction of the screw-nut system. The threaded ring 39 produces, when rotated by a pin 35, an axial shifting of the driving shaft 36 corresponding to the axial shifting of the threaded ring 39. Thus, the driving shaft 36 associated with the axial rear stop (that is of the polygonal section 37 on the pin 35) can take an initial position adapted to the type of headlamp. Instead of a pin, it is also possible to provide any other suitable actuating element.

The aforementioned device has been described by means of an example where the driving shaft of the element to be positioned executes an axial shifting, the element itself, that is the headlamp of a car, pivoting about the shaft 4 (see FIG. 1). However, the invention is not limited to solely axial positioning of the driven element but extends also to other possibilities for angular positioning of the latter by means of a gear train.

In the case of axial positioning of the driving shaft, part of the advantages derived by the precise positioning would be vitiated if the axial shifting of the shaft 2 was affected by an axial play, which although unavoidable, has, therefore, to be kept relatively small and must remain constant. Particularly, in the range of applications for the adjustment of headlamps of a car, a relatively large axial play would lead to almost continuous oscillation of the light beam, such a situation being particularly undesirable.

Figure 3:
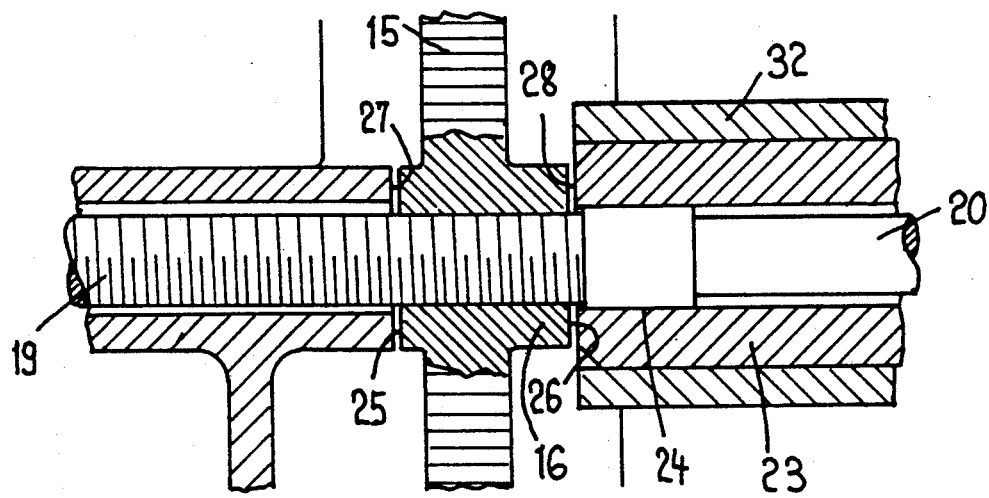
FIG. 3 shows in detail a portion of FIG. 2.

In FIGS. 2 and 3, it is observed that if the faces 25, 26 of the hub 16 of the wheel 15 come in contact with the faces 27, 28, respectively, due to the mounting of the bushing 23 (e.g. by driving it in the bearing 32 of the housing"), force of friction between the various parts would have to be overcome by the stepping motor. Motors of small power utilized in these types of devices would not be suitable any more. Further, the utilization of motors of greater power would be too expensive for such devices.

The present invention also provides a method for limiting the axial play to a maximum of 0.05 mm, such a method not being limited to the described positioning devices.

In order to limit the friction, a pressure P is exerted on the frontal part 29 of the housing 11, the force being transmitted to the bearing 32 after the wheel 15 and the shaft 2 have been assembled. Then, the bushing 23 is introduced until the face 28 comes in abutment against the face 26 of the hub 16. The pressure, the value of which is a function of the rigidity of the material chosen for the housing, will produce a resilient shifting d of the bearing 32 towards the inside of the housing. See FIG. 2. The pressure is chosen so that d=0.02 mm maximum. The fixed joining of the bushing 23 and the housing 11 is effected while the pressure is maintained, preferably by ultrasonic welding. After this joining is executed, the pressure is removed so that the parts 29, 32 recoil by a distance equal, or approximately equal to d, carrying away the bushing 23 and thus freeing the hub of the wheel while limiting the amount of play. The definitive play will thus be 0.02 augmented by the play of the threads of the screw-nut system 17, 19, thus, greater than 0.02 mm, but in all cases, lower than 0.05 mm which constitutes the maximum limit for the play that must not be exceeded.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A device for positioning an element capable of attaining different predetermined positions between two extreme positions, comprising a driving shaft coupled to said element, said driving shaft being driven by a stepping motor, said device including means for counting steps taken by said stepping motor and reinitiating said counting, said stepping motor being controlled by an open-loop control.

2. The device according to claim 1, further comprising means for detecting a loss of steps taken by said stepping motor to detect an error in positioning of said element.

3. The device according to claim 2, wherein said driving shaft is connected to a rotor of said stepping motor through a gear reduction system having a specified reduction ratio.

4. The device according to claim 2, further comprising means for signalling an error in positioning after a predetermined number of unsuccessful positioning attempts have been tried.

5. The device according to claim 1, wherein said driving shaft is connected to a rotor of said stepping motor through a gear reduction system having a specified reduction ratio.

6. The device according to claim 5, wherein said rotor further comprises an output shaft, said gear reduction system comprises a first gear element mounted on said output shaft of said rotor and a second gear element coacting with said first gear element, said second gear element being mounted on said driving shaft, said driving shaft further comprising a threaded part and having a predetermined axial movement.

7. The device according to claim 1, further comprising one or more stops, said reinitiating of counting taking place when said stepping motor is stopped by one of said stops.

8. The device according to claim 7, wherein at least one of said stops is adjustable.

9. The device according to claim 8, further comprising means for positioning said driving shaft at an initial position corresponding to a predetermined position of said element.

10. The device according to claim 1, wherein said driving shaft is rotationally coupled to said stepping motor and is movable axially, said rotational movement being converted to translatory movement by means of a screw and nut system, said screw and nut system permitting said translatory movement to take place over a defined distance.

11. The device according to claim 1, wherein said element is the headlamp of an automobile.

12. A method for assembling a gear component of a gear reduction system of a device for positioning an element capable of attaining different predetermined positions between two extreme positions, comprising the steps of:
   (a) mounting said gear component having a hub on a driving shaft coupled to said element, said driving shaft being driven by a stepping motor, said stepping motor comprising means for reinitiating counting of steps and being controlled by an open-loop control;
   (b) positioning a first face of said hub of said gear component against a means for limiting axial movement of said gear component in one direction;
   (c) positioning a bushing against a second face of said hub of said gear component, said bushing limiting axial movement of said gear component in a direction opposite to said first direction, said bushing being disposed in a bearing;
   (d) exerting pressure on said bearing towards said hub of said gear component in order to resiliently shift said bearing by a distance d;
   (e) joining said bushing and said bearing; and
   (f) removing said pressure from said bearing.

13. A method according to claim 12, wherein said distance d is 0.02 mm.

14. A method according to claim 12, wherein said bushing and said bearing are joined by ultrasonic welding.

15. A method according to claim 13, wherein said bushing and said bearing are joined by ultrasonic welding.

* * * * *